(12) United States Patent
Hinosugi

(10) Patent No.: US 8,929,205 B2
(45) Date of Patent: Jan. 6, 2015

(54) PACKET RELAY APPARATUS

(75) Inventor: Hideki Hinosugi, Tokyo (JP)

(73) Assignee: Alaxala Networks Corporation, Kanagawa (JP)

( * ) Notice: Subject to any disclaimer, the term of this patent is extended or adjusted under 35 U.S.C. 154(b) by 92 days.

(21) Appl. No.: 13/312,162

(22) Filed: Dec. 6, 2011

(65) Prior Publication Data

US 2012/0155254 A1 Jun. 21, 2012

(30) Foreign Application Priority Data

Dec. 15, 2010 (JP) ................................. 2010-278748

(51) Int. Cl.
*H04L 12/26* (2006.01)
*H04L 12/939* (2013.01)
(52) U.S. Cl.
CPC .................................. *H04L 49/557* (2013.01)
USPC ....................................................... 370/228
(58) Field of Classification Search
USPC .................. 370/228, 216, 229, 235
See application file for complete search history.

(56) References Cited

U.S. PATENT DOCUMENTS

| 2008/0068985 A1* | 3/2008 | Mieno ........................... 370/217 |
| 2010/0157800 A1* | 6/2010 | Liu et al. ....................... 370/235 |
| 2011/0258346 A1* | 10/2011 | Said et al. ..................... 709/249 |
| 2012/0051228 A1* | 3/2012 | Shuman et al. ............... 370/242 |

FOREIGN PATENT DOCUMENTS

| JP | 2007-208579 A | 8/2007 |
| JP | 2008-78893 A | 4/2008 |
| WO | 01/13555 A1 | 2/2001 |

OTHER PUBLICATIONS

IEEE Standard for Local and metropolitan area networks, Link Aggregation, IEEE Std. 802.1AX—2008.

* cited by examiner

*Primary Examiner* — Andrew Lai
*Assistant Examiner* — Zhiren Qin
(74) *Attorney, Agent, or Firm* — Mattingly & Malur, PC

(57) ABSTRACT

A packet relay apparatus of the type that can virtually use in the interlocking arrangement a plurality of apparatuses includes a link optimization adjustment part and a packet analyzing unit, automatically judges the mode of flow of communication and traffic and optimizes the line that is mainly operated, to manage the traffic flowing through a control port and make up for band insufficiency of the control port.

7 Claims, 18 Drawing Sheets

FIG. 6
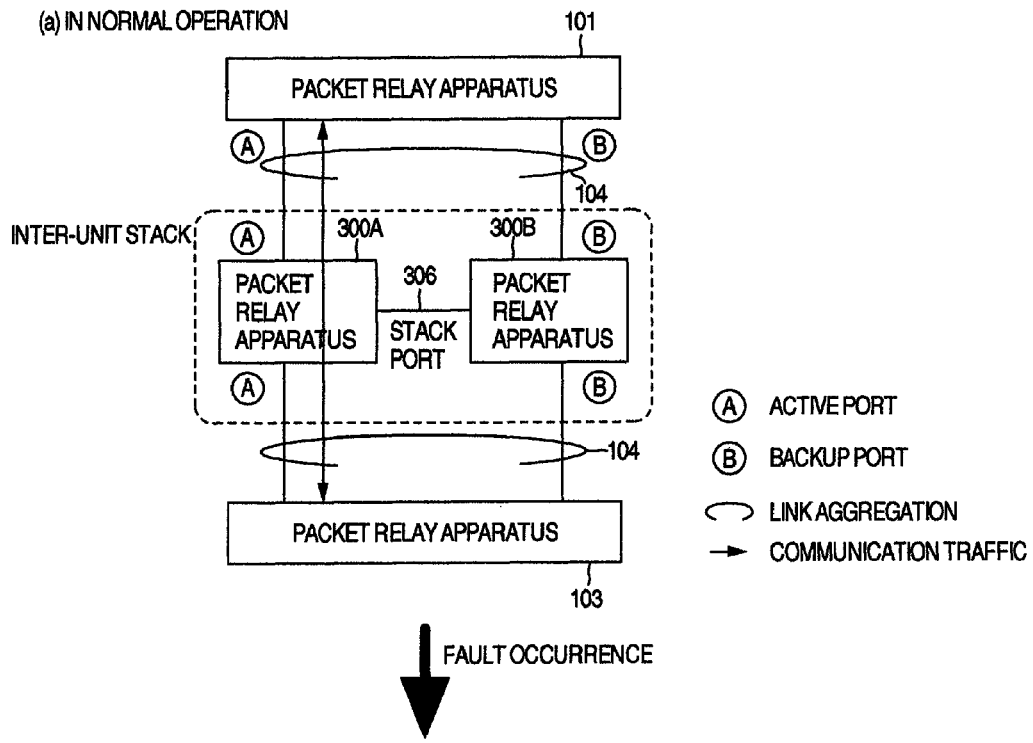
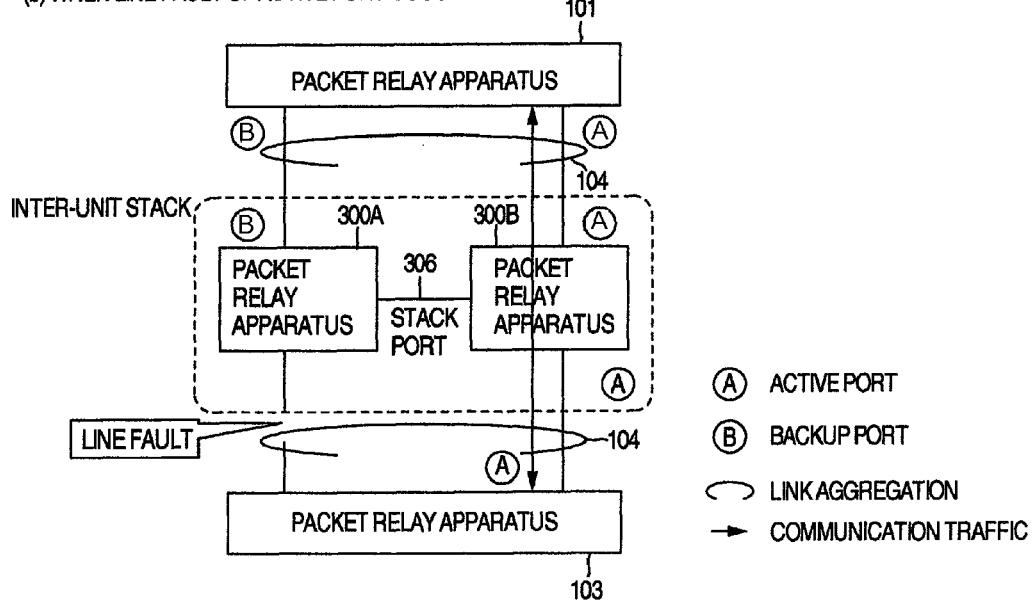

FIG. 10A

LAG SETTING TABLE 1000

| APPARATUS ID | LINE NO. | LAG GROUP ID | ACTIVE/ BACKUP SETTING | ACTIVE/ BACKUP STATUS |
|---|---|---|---|---|
| 1 | 1 | 1 | ACTIVE | ACTIVE |
|  | 2 | 2 | ACTIVE | ACTIVE |
|  | 3 | 3 | ACTIVE | ACTIVE |
|  | 4 | 4 | ACTIVE | ACTIVE |
| 2 | 1 | 1 | BACKUP | BACKUP |
|  | 2 | 2 | BACKUP | BACKUP |
|  | 3 | 3 | BACKUP | BACKUP |
|  | 4 | 4 | BACKUP | BACKUP |

FIG. 10B

COMMUNICATION AVAILABILITY MATRIX TABLE 1001

DESTINATION PORT

| SOURCE PORT | 1/1 | 1/2 | 1/3 | 1/4 | 2/1 | 2/2 | 2/3 | 2/4 |
|---|---|---|---|---|---|---|---|---|
| 1/1 | — | X | X | O | X | X | X | △ |
| 1/2 | X | — | X | O | X | X | X | △ |
| 1/3 | X | X | — | O | X | X | X | △ |
| 1/4 | O | O | O | — | △ | △ | △ | X |
| 2/1 | X | X | X | △ | — | X | X | △ |
| 2/2 | X | X | X | △ | X | — | X | △ |
| 2/3 | X | X | X | △ | X | X | — | △ |
| 2/4 | △ | △ | △ | X | △ | △ | △ | — |

(REMARKS) X : COMMUNICATION UNAVAILABLE
O : COMMUNICATION AVAILABLE
△ : COMMUNICATION LIMITED BY OPERATION (LAG BACKUP PORT)

FIG. 11

| RECEPTION· APPARATUS ID | RECEPTION· LINE NUMBER | TRANSMISSION· APPARATUS ID | TRANSMISSION· LINE NUMBER | TRAFFIC INFORMATION |
|---|---|---|---|---|
| 1 | 1 | 1 | 1 | 0Mbps |
| ... | ... | ... | ... | ... |
| 1 | 4 | 1 | 1 | 950Mbps |
| 1 | 4 | 1 | 2 | 320Mbps |
| 1 | 4 | 1 | 3 | 240Mbps |
| 1 | 4 | 1 | 4 | 0Mbps |
| 1 | 4 | 2 | 1 | 130Mbps |
| 1 | 4 | 2 | 2 | 340Mbps |
| 1 | 4 | 2 | 3 | 80Mbps |
| 1 | 4 | 2 | 4 | 0Mbps |

FIG. 15A

LAG SETTING TABLE 1000

| APPARATUS ID | LINE NO. | LAG GROUP ID | ACTIVE/ BACKUP SETTING | ACTIVE/ BACKUP STATUS |
|---|---|---|---|---|
| 1 | 1 | 1 | ACTIVE | ACTIVE |
|   | 2 | 2 | ACTIVE | ACTIVE |
|   | 3 | 3 | ACTIVE | LINK DOWN |
|   | 4 | 4 | ACTIVE | ACTIVE |
| 2 | 1 | 1 | BACKUP | BACKUP |
|   | 2 | 2 | BACKUP | BACKUP |
|   | 3 | 3 | BACKUP | ACTIVE |
|   | 4 | 4 | BACKUP | BACKUP |

FIG. 15B

COMMUNICATION AVAILABILITY MATRIX TABLE 1001
DESTINATION PORT

| SOURCE PORT \ DEST | 1/1 | 1/2 | 1/3 | 1/4 | 2/1 | 2/2 | 2/3 | 2/4 |
|---|---|---|---|---|---|---|---|---|
| 1/1 |   | X | X | O | X | X | X | △ |
| 1/2 | X |   | X | O | X | X | X | △ |
| 1/3 | X | X |   | X | X | X | X | X |
| 1/4 | O | O | X |   | △ | △ | O | X |
| 2/1 | X | X | X | △ |   | X | X | △ |
| 2/2 | X | X | X | △ | X |   | X | △ |
| 2/3 | X | X | X | O | X | X |   | △ |
| 2/4 | △ | △ | X | X | △ | △ | △ |   |

(REMARKS) X : COMMUNICATION UNAVAILABLE
O : COMMUNICATION AVAILABLE
△ : COMMUNICATION LIMITED BY OPERATION (LAG BACKUP PORT)

FIG. 17A

LAG SETTING TABLE  1700

| APPARATUS ID | LINE NO. | LAG GROUP ID | ACTIVE/ BACKUP SETTING | ACTIVE/ BACKUP STATUS |
|---|---|---|---|---|
| 1 | 1 | 1 | ACTIVE | BACKUP |
|   | 2 | 2 | ACTIVE | BACKUP |
|   | 3 | 3 | ACTIVE | LINK DOWN |
|   | 4 | 4 | ACTIVE | BACKUP |
| 2 | 1 | 1 | BACKUP | ACTIVE |
|   | 2 | 2 | BACKUP | ACTIVE |
|   | 3 | 3 | BACKUP | ACTIVE |
|   | 4 | 4 | BACKUP | ACTIVE |

FIG. 17B

COMMUNICATION AVAILABILITY MATRIX TABLE  1001

DESTINATION PORT

| SOURCE PORT | 1/1 | 1/2 | 1/3 | 1/4 | 2/1 | 2/2 | 2/3 | 2/4 |
|---|---|---|---|---|---|---|---|---|
| 1/1 | — | x | x | △ | x | x | x | △ |
| 1/2 | x | — | x | △ | x | x | x | △ |
| 1/3 | x | x | — | x | x | x | x | x |
| 1/4 | △ | △ | x | — | △ | △ | △ | x |
| 2/1 | x | x | x | △ | — | x | x | ○ |
| 2/2 | x | x | x | △ | x | — | x | ○ |
| 2/3 | x | x | x | △ | x | x | — | ○ |
| 2/4 | △ | △ | x | x | ○ | ○ | ○ | — |

(REMARKS)   x : COMMUNICATION UNAVAILABLE
  ○ : COMMUNICATION AVAILABLE
  △ : COMMUNICATION LIMITED BY OPERATION (LAG BACKUP PORT)

FIG. 18

| SOURCE PORT \ DESTINATION PORT | 1/1 | 1/2 | 1/3 | 1/4 | 2/1 | 2/2 | 2/3 | 2/4 |
|---|---|---|---|---|---|---|---|---|
| 1/1 |  | 0 | 1GB | 3GB | 0 | 10GB | 0 | 0 |
| 1/2 | 0 |  | ... | ... | ... | ... | ... | ... |
| 1/3 | 1GB | ... |  | ... | ... | ... | ... | ... |
| 1/4 | 3GB | ... | ... |  | ... | ... | ... | ... |
| 2/1 | 0 | ... | ... | ... |  | ... | ... | ... |
| 2/2 | 5GB | ... | ... | ... | ... |  | ... | ... |
| 2/3 | 0 | ... | ... | ... | ... | ... |  | ... |
| 2/4 | 0 | ... | ... | ... | ... | ... | ... |  |

1800

PACKET RELAY APPARATUS

INCORPORATION BY REFERENCE

The present application claims priority from Japanese application JP2010-278748 filed on Dec. 15, 2010, the content of which is hereby incorporated by reference into this application.

BACKGROUND OF THE INVENTION

This invention relates to a communication processing technology for a packet relay apparatus having a plurality of packet relay engines or a system.

A network using packet relay apparatuses such as routers and switches is in many cases constituted by a hierarchical type network such as the one shown in FIG. 1. In comparison with a full mesh type construction in which all the packet relay apparatuses are connected through communication cables, the hierarchical type network has the advantage that a network having a greater scale can be constituted by a smaller number of packet relay apparatuses owing to the reduction of the number of communication cables but is not free from the problem that fault exerts greater influences once such a fault occurs in any of upstream packet relay apparatuses.

Therefore, high availability is required for the packet relay apparatuses arranged in upstream hierarchy of the hierarchical type network. Availability is calculated from the probability of the occurrence of system fault and shortness of the propagation time when the system fault occurs. To improve availability, it is very important to quickly restore the system when the fault occurs in addition to the reduction of the system fault occurrence ratio.

Packet relay apparatuses having all the features of Patent Literature 1, Patent Literature 2 and Non Patent Literature 3 are known as means for improving availability. The packet relay apparatus disclosed in Patent Literature 1 has the feature in that the operation can be continued by making all modules redundant and activating a standby module even when a fault occurs in a certain module. The packet relay apparatus disclosed in Patent Literature 2 has the features in that the modules are not rendered redundant as a single apparatus but the packet relay apparatus attains redundancy by causing a plurality of apparatuses to virtually operate as if they were a single unit and can continuously keep the operation by other packet relay apparatuses that are grouped virtually (this technology will be hereinafter called "inter-unit stack technology") even when a fault occurs in a packet relay apparatus.

Link aggregation disclosed in Non Patent Literature 1 has the feature in that it can secure redundancy of a line by providing means capable of logically gathering a plurality of cables into one and using the cable by connecting a plurality of communication cables connecting the apparatuses. Incidentally, when used in combination with the packet relay apparatuses disclosed in Patent Literatures 1 and 2, link aggregation of Non Patent Literature can improve availability.

FIG. 1 shows an example of a typical hierarchical type network. Referring to FIG. 1, a packet relay apparatus 101 capable of redundancy inside a single apparatus is arranged in the uppermost core layer among three hierarchical structures. This apparatus has the feature disclosed in Patent Literature 1. A packet relay apparatus 102 that can be topped when a plurality of apparatuses is virtually regarded as one unit is arranged in an intermediate distribution layer and has the feature described in Patent Literature 2.

A packet relay apparatus 103 not having the redundancy function of the apparatus is arranged in the lowermost access layer and does not have the technology of high redundancy described in Patent Literatures 1 (JP-A-2007-208579) and 2 (JP-A-2008-78893). Generally, although the packet relay apparatus 101 such as the one described in Patent Literature 1 has high availability, it is arranged in many cases in a hierarchy having a greater range of influences because the apparatus cost is high. Transmission cables are rendered redundant for communication cables connecting each packet relay apparatus by link aggregation 104 described in Non Patent Literature 1 ("IEEE Standard for Local and metropolitan area networks—Link Aggregation" IEEE Std 802.1AX™-2008).

SUMMARY OF THE INVENTION

The packet relay apparatus disclosed in Patent Literature 1 employs the cross-connection structure shown in FIG. 2 so that modules can be rendered redundant by the single apparatus and can be quickly switched to a backup module when the fault occurs.

The packet relay apparatus shown in FIG. 2 includes therein a control unit 201, a forwarding unit 202 and a line unit 203 each line of which is made redundant, A packet relay engine 204 deciding the destination of the packet exists inside the forwarding unit 202 and is equipped with a destination table 205 storing information that decides to which destination the packet is to be transferred. When receiving a packet, the packet relay engine 204 decides from which line unit 203 the packet is to be outputted by referring to the destination table 205.

The control unit 201, the forwarding unit 202 and the line unit 203 of the packet relay apparatus 200 employ the cross-connection structure in which they cross, and are connected to, a plurality of blocks with respect to adjacent units. Therefore, when a fault occurs in the forwarding unit 202A used for the operation, for example, the continuous operation can be made by the forwarding unit 202B by a simple switching processing that selects the path connecting the line unit 203A to the forwarding unit 202B.

When switching is made as described above, synchronization (shift of state to the same state) is established on the real time basis inside the packet relay apparatus for the destination table 205 in the packet relay engine 204, and even when the backup forwarding unit 202B is used with the occurrence of the fault in the operation system, communication can be made without executing re-learning of the destination table 205. Therefore, the occurrence time of cutoff of communication can be reduced.

As described above, the packet relay apparatus disclosed in Patent Literature 1 can reduce the restoration time of the occurrence of the fault by employing the cross-connection structure and synchronization of the destination table 205. As a result, the packet relay apparatus has high availability but invites the problem of the increase of the number of component parts/consumed power/cost/installation space owing to complicatedness of the hardware structure. The packet relay apparatus disclosed in Patent Literature 1 is no exception and the problem described above exists.

The packet relay apparatus disclosed in Patent Literature 2 has the inter-unit stack technology for making a plurality of packet relay apparatuses redundant by causing them to virtually operate as if they were one unit. Patent Literature 2 discloses the construction shown in FIG. 3. The packet relay apparatus 300 shown in FIG. 3 includes inside the apparatus one each of control unit 301, forwarding unit 302 and line unit 303. The difference of this apparatus from the packet relay apparatus 200 shown in FIG. 200 is that each unit is not made redundant inside the single apparatus but a plurality of apparatuses is caused to operate virtually as one unit of packet relay apparatus by using an inter-unit stack.

Incidentally, to materialize the inter-unit stack, a stack port 306 for synchronizing the packet relay apparatuses constituting the inter-unit stack such as setting of various devices and synchronization of the destination table 305 inside the packet relay engine 304. The stack port 306 serves as a transmission line when communication is necessary while bridging a plurality of packet relay apparatuses 300 besides setting of various devices and exchange of control information used for synchronization among the packet relay apparatuses.

When the line band of the stack port 306 is smaller than the inflowing traffic, the stack port 306 undergoes congestion and packet discard (blocking) occurs. To avoid such blocking, a greater line band of the stack port 306 must be secured. When an inter-unit stack is constituted by a packet relay apparatus 300 having 24 lines as shown in (a) of FIG. 4 and 12 lines are allocated as the stack port 306, blocking of the stack port 306 can be avoided but the interface that can be connected to external communication equipment is only 12 lines per packet relay apparatus. When only four lines are allocated to the stack port as shown in (b) of FIG. 4, the interface that can be connected to the external communication equipment can allocate 20 lines to one packet relay apparatus but the problem of blocking described above is likely to occur.

As described above, a large line band must be allocated to the stack port to avoid blocking at the stack port. On the other hand, when a large line band is allocated to the stack port, efficient constitution of the network system is impeded and the constitution cost of the network becomes high.

The technical problem that the invention is to solve is to provide a technology for constitute efficiently (inclusive of reduction of the number of component parts/consumed power/cost/installation space) a network system capable of behaving virtually as one unit of apparatus.

To solve at least a part of the problem described above, the invention provides an apparatus of the type a plurality of which operates virtually as one unit, wherein, when a first apparatus and a second apparatus are used virtually as one unit, the first and second apparatus are connected at a part of ports both of the apparatuses have; a plurality of logical lines for grouping and handling parts of the ports of the first and second apparatuses is incorporated; a physical line for transfer and a backup physical line exist inside the logical line; and when traffic between the first and second apparatuses exceeds a predetermined threshold owing to a fault of the transfer physical line inside the logical line, the logical lines other than the logical line in which the fault occurs switch the backup physical line to the transfer physical line, too.

An efficient network system can be accomplished at a low cost by using the invention.

Other objects, features and advantages of the invention will become apparent from the following description of the embodiments of the invention taken in conjunction with the accompanying drawings.

BRIEF DESCRIPTION OF DRAWINGS

FIG. 6 is a view showing an example of a communication route during a normal operation and at the time of occurrence of faults when a network relay apparatus is employed.

FIG. 10A is a view showing an example of an LAG setting table.

FIG. 10B is a view showing an example of communication availability matrix table.

FIG. 11 is a view showing an example of an accumulation table.

FIG. 15A is a view showing an example of an LAG setting table.

FIG. 15B is a view showing an example of a communication availability matrix table.

FIG. 17A is a view showing an example of an LAG setting table.

FIG. 17B is a view showing an example of a communication availability matrix table.

FIG. 18 is an example of accumulation table.

DESCRIPTION OF THE EMBODIMENTS

Embodiment 1

To begin with, the outline of processing at the time of a fault during a normal operation will be explained about a simple network construction when inter-unit stack is used, by way of example.

Figure 1:
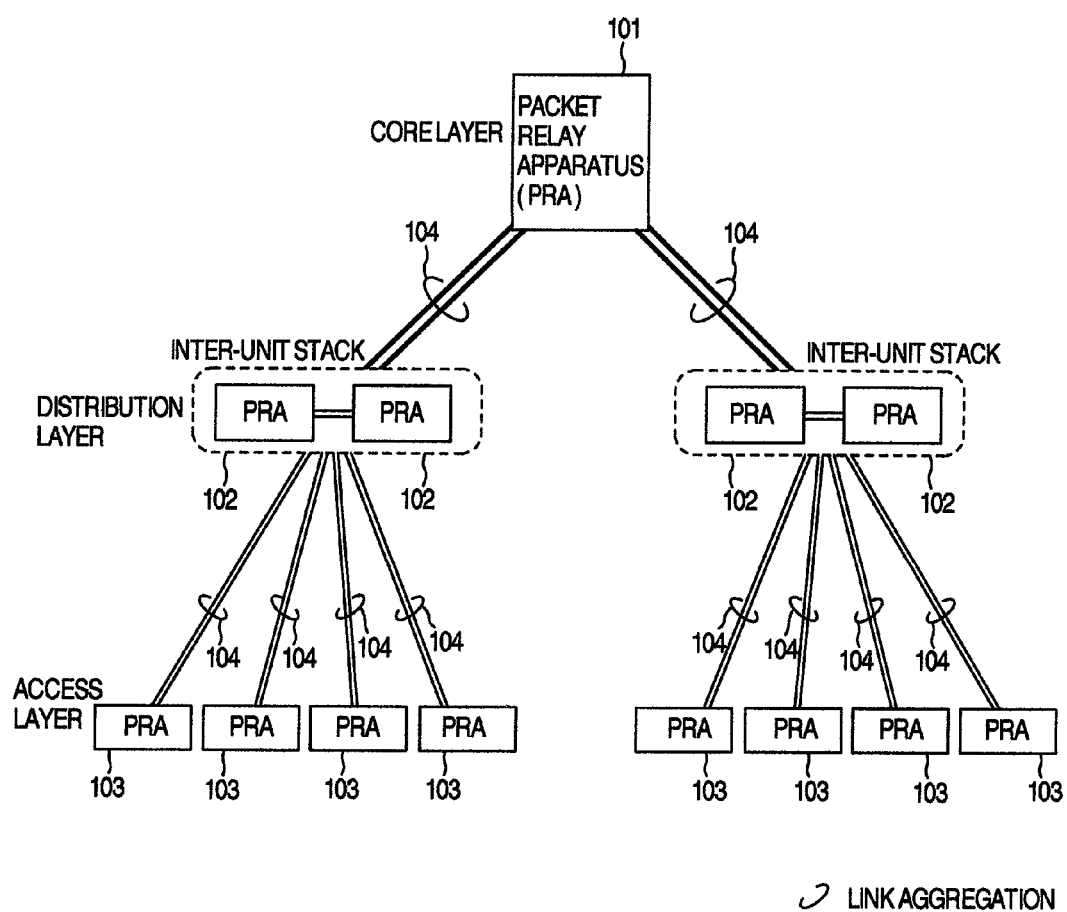
FIG. 1 shows a structural example of a hierarchical type network.
Figure 2:
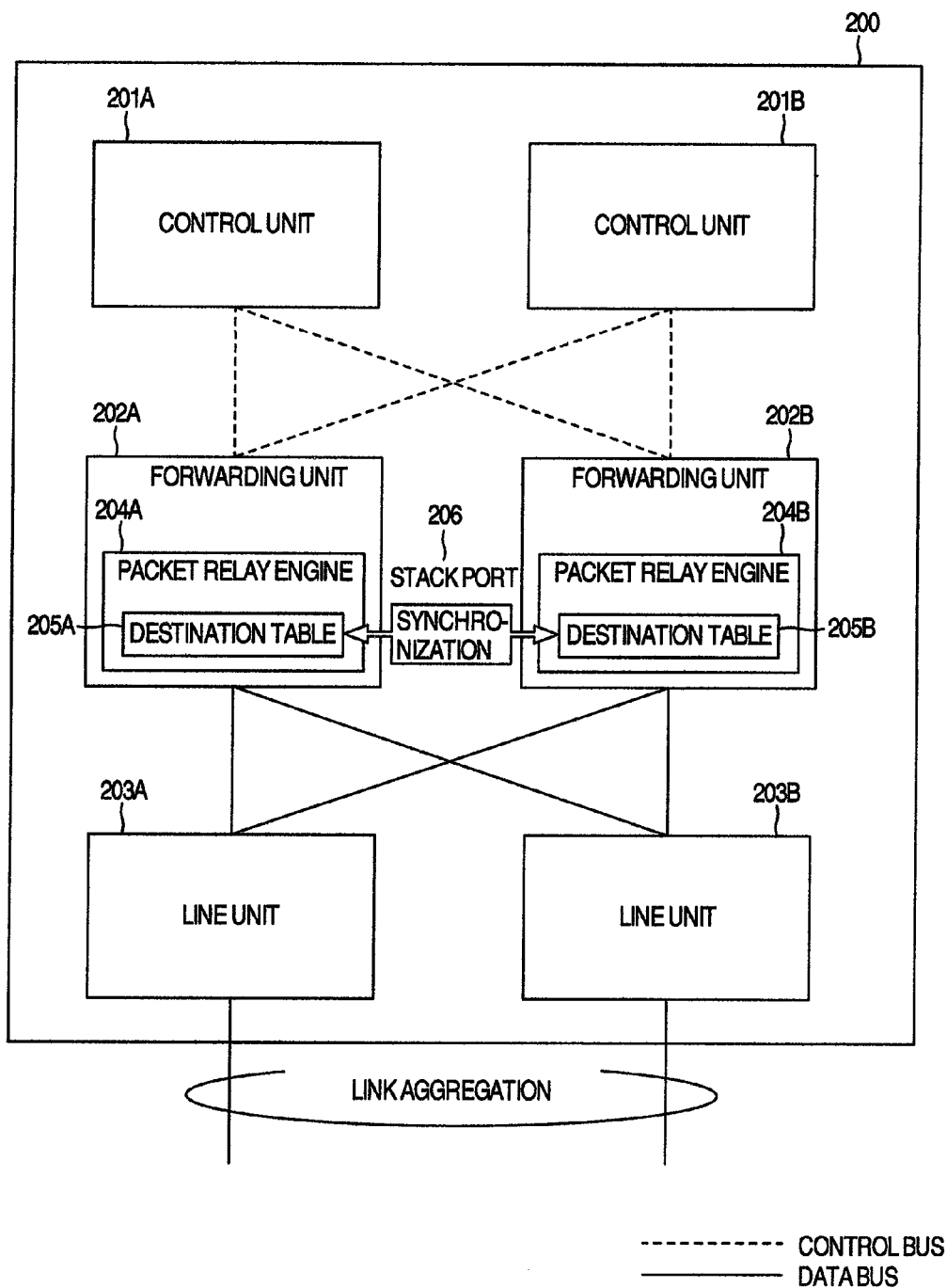
FIG. 2 shows a structural example of a packet relay apparatus employing a cross-connection structure.
Figure 3:
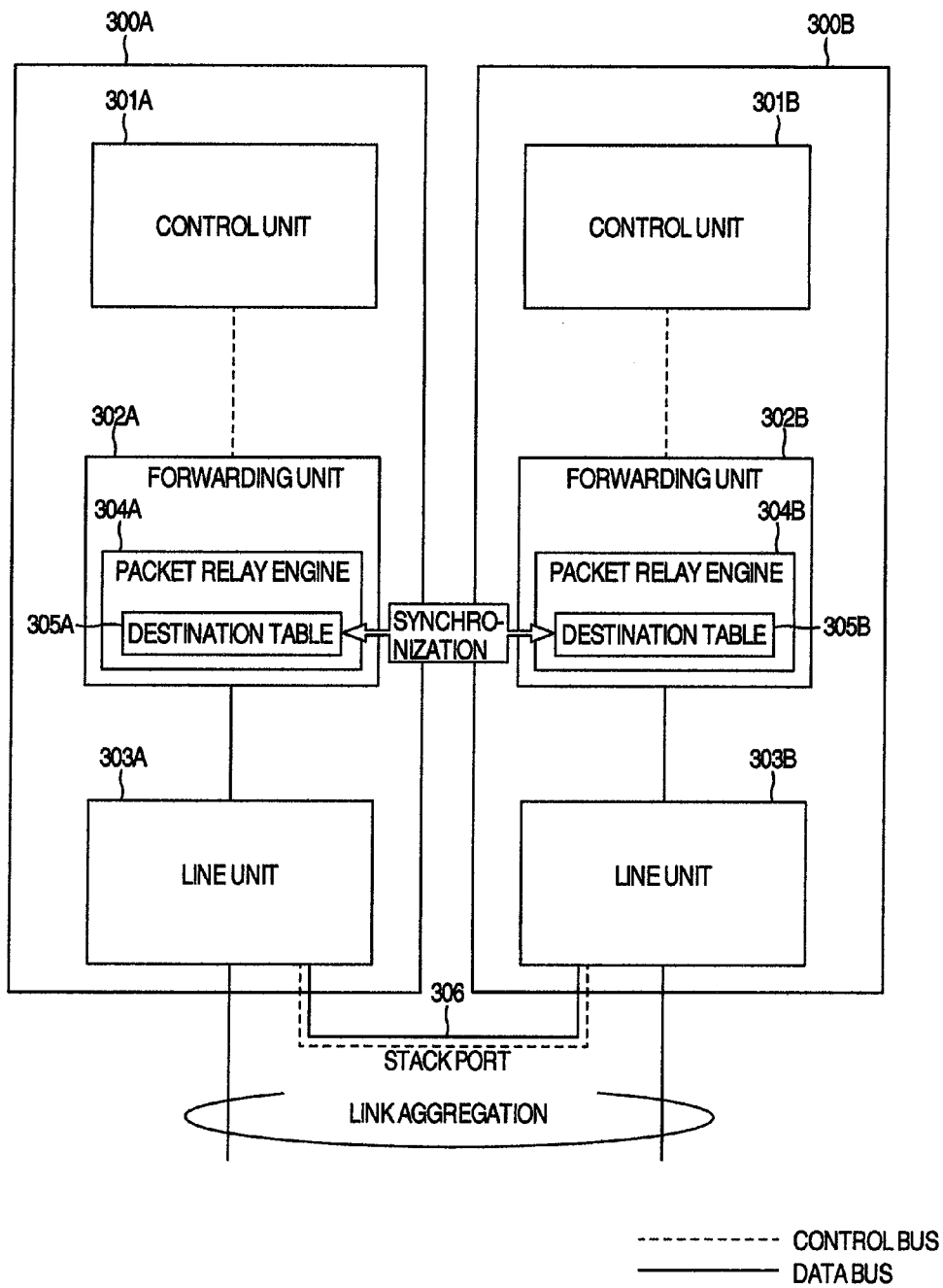
FIG. 3 shows a structural example of a packet relay apparatus employing an inter-unit stack technology.
Figure 4:
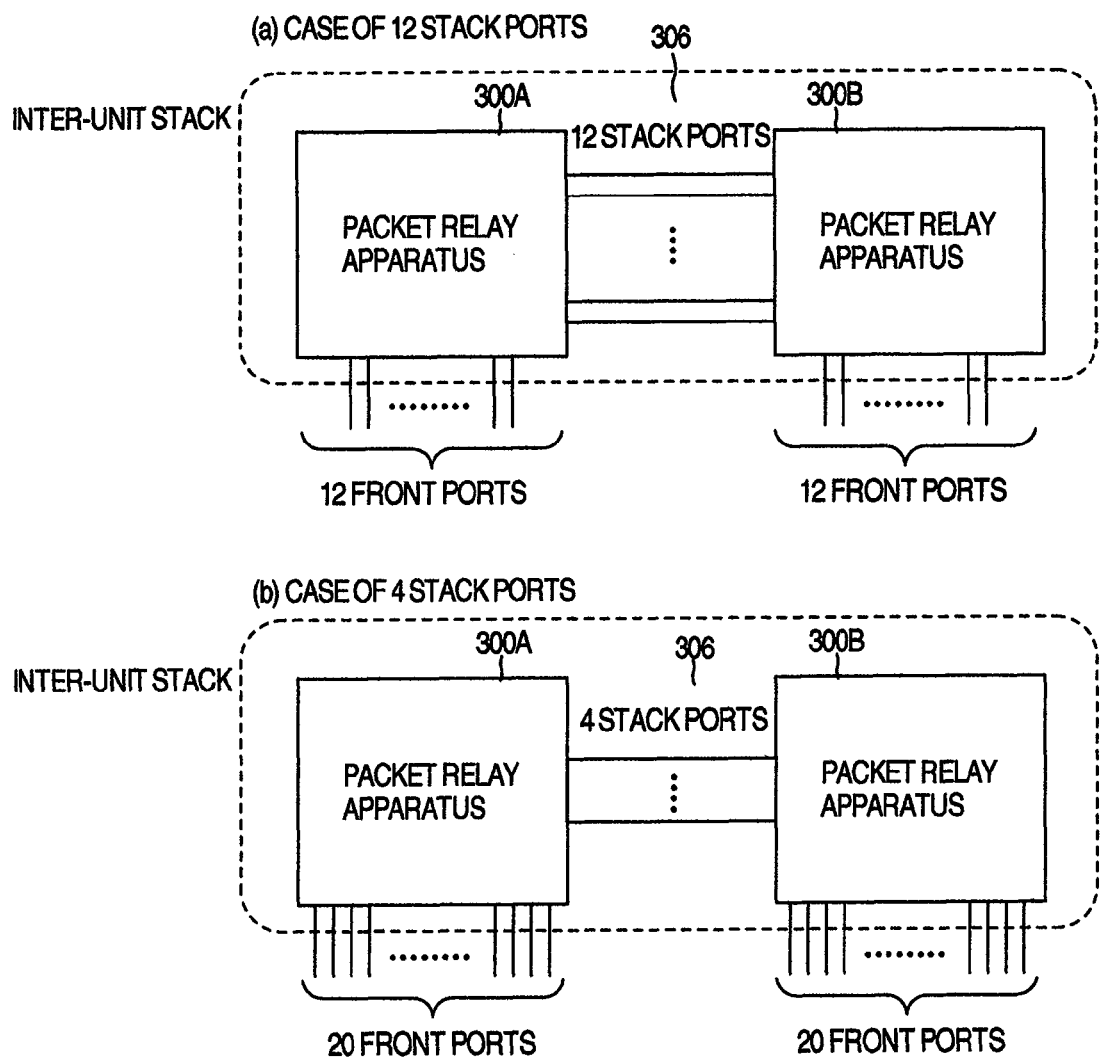
FIG. 4 is a view showing an example of influences of the number of stack ports when the inter-unit stack technology is employed.
Figure 5:
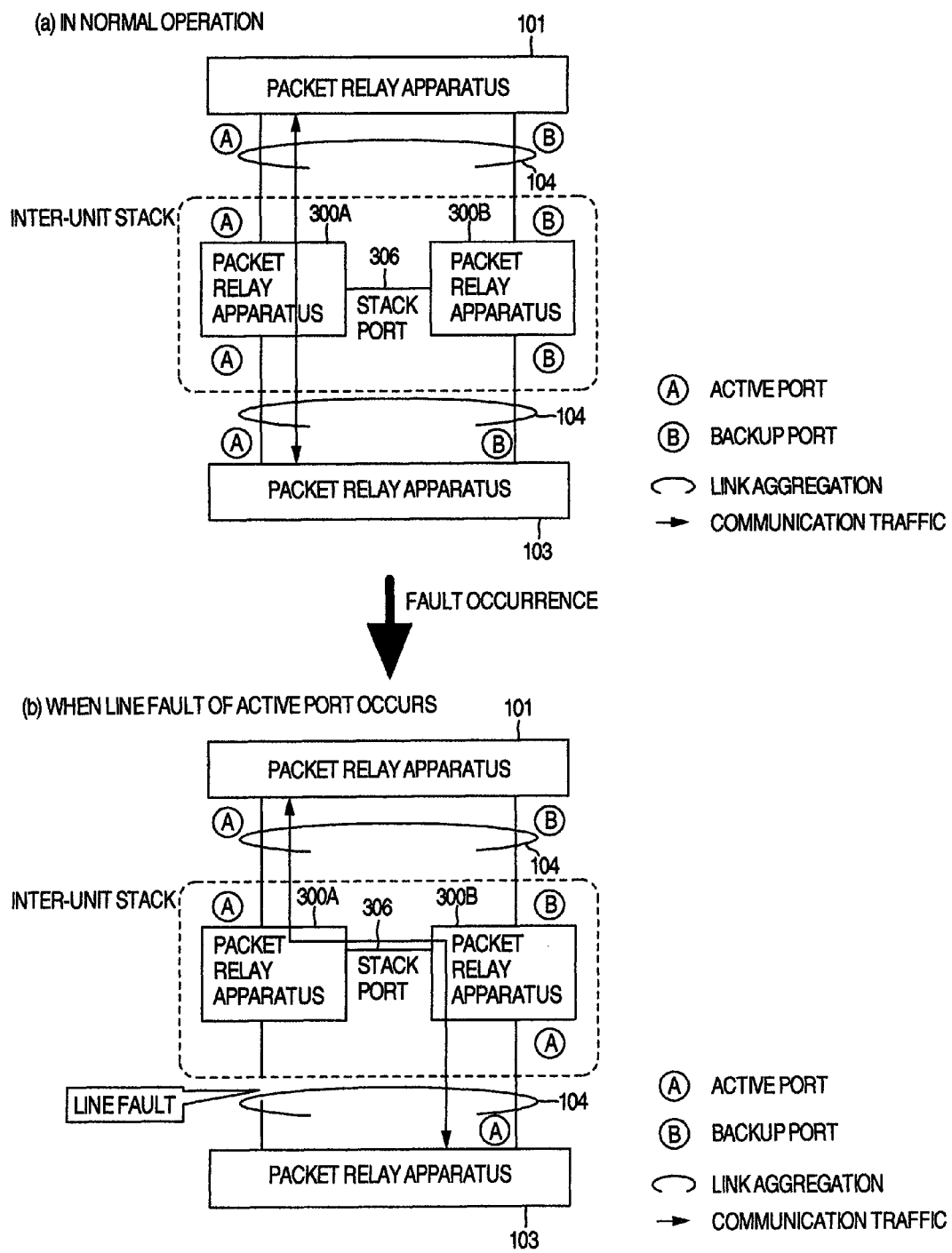
FIG. 5 is a view showing an example of a communication route during a normal operation and a communication route at the time of occurrence of faults when ordinary inter-unit stack technology is employed.

FIG. 5 shows a structural example of a network system of a packet relay apparatus using an inter-unit stack. To secure a transmission route even when one of the packet relay apparatuses 300A or 300B undergoes fault, the network system using the inter-unit stack improves availability by forming a link aggregation group between the lines connected to mutually different packet relay apparatuses 300A and 300B using communication cables connected to adjacent packet relay apparatuses.

In the normal operation shown in (a) of FIG. 5, the line connected to the packet relay apparatus 300A among those which belong to the link aggregation group is designated to an active port and the line connected to the packet relay apparatus 300B, to a backup port, so that data communication transferred through a stack port 306 does not occur. In this way, the traffic through the stack port 306 can be reduced during the normal operation depending on configuration (setting) of an operator.

When line fault of the active port shown in (b) of FIG. 5 occurs, a processing for shifting the line connected to the packet relay apparatus 300B from the backup port to the active port is executed as a result of degradation of the active port connected to the packet relay apparatus 300A of the link aggregation group in which the line fault occurs. When such a line fault occurs in the link aggregation, continuity of communication is insured by shifting the backup port to the active port.

In the structural example of the network system of the packet relay apparatus using the inter-unit stack shown in (b) of FIG. 5, on the other hand, data communication is made through the stack port 306 owing to the line fault. Continuity of communication is insured when the line fault occurs but when the line band of the stack port 306 is not secured sufficiently, on the other hand, the band insufficiency invites bottleneck on the network system and packet discard is likely to occur.

FIG. 6 shows a structural example of the network system of the packet relay apparatus using the inter-unit stack according to the invention. To secure a transmission route even when one of the packet relay apparatuses 300A or 300B undergoes fault in the network system using the inter-unit stack according to the invention, it can improve availability by forming a link aggregation group between the lines connected to mutually different packet relay apparatuses 300A and 300B using communication cables connected to adjacent packet relay apparatuses.

In the normal operation shown in (a) of FIG. 6, the line connected to the packet relay apparatus 300A among those which belong to the link aggregation group is designated to the active port and the line connected to the packet relay apparatus 300B, to the backup port, so that data communication transferred through the stack port 306 does not occur.

Next the operation during the occurrence of a fault will be explained with reference to (b) of FIG. 6. A processing for shifting the line connected to the packet relay apparatus 300B from the backup port to the active port is executed as a result of degradation of the active port connected to the packet relay apparatus 300A of the link aggregation group in which the line fault occurs, in the same way as in the prior art technology. As for the group in which the line fault does not occur, too, the status transition processing of the active port/backup port is executed and in this way, it becomes possible to minimize the flow of data communication to the stack port 306 when the line fault occurs.

In the example shown in (b) of FIG. 6, the line fault occurs between the packet relay apparatus 103 and the packet relay apparatus 300A. Therefore, the port for the line between the packet relay apparatus 103 that has operated as the backup port during the normal operation is switched to the active port in the same way as in the prior art technology.

When this state is kept as such, communication between the packet relay apparatus 101 and the packet relay apparatus 103 is made through the stack port 306. Therefore, the port for the line between the packet relay apparatus 101 in which fault does not occur originally and the packet relay apparatus 300A is changed to the backup port and the line between the packet relay apparatus 101 and the packet relay apparatus 300B is rendered active. In consequence, communication between the packet relay apparatus 101 and the packet relay apparatus 103 passes through the packet relay apparatus 300B without passing at all through the stack port 306.

In the network system of the packet relay apparatus according to the invention, the data patterns and the traffic passing through the stack port 306 are monitored and the active port/backup port of the link aggregation is dynamically selected so as to minimize the flow of the data communication through the stack port 306.

When the technology of the invention (the mechanism for selecting the active port by taking various other conditions into consideration in addition to the status inside the link aggregation logically forming the group) is applied, it is possible to provide a technology for constituting efficiently a network system (inclusive of the reduction of the number of components/consumed power/cost/installation space) capable of operating virtually as one unit of apparatus by connecting a plurality of packet relay apparatuses.

Figure 7:
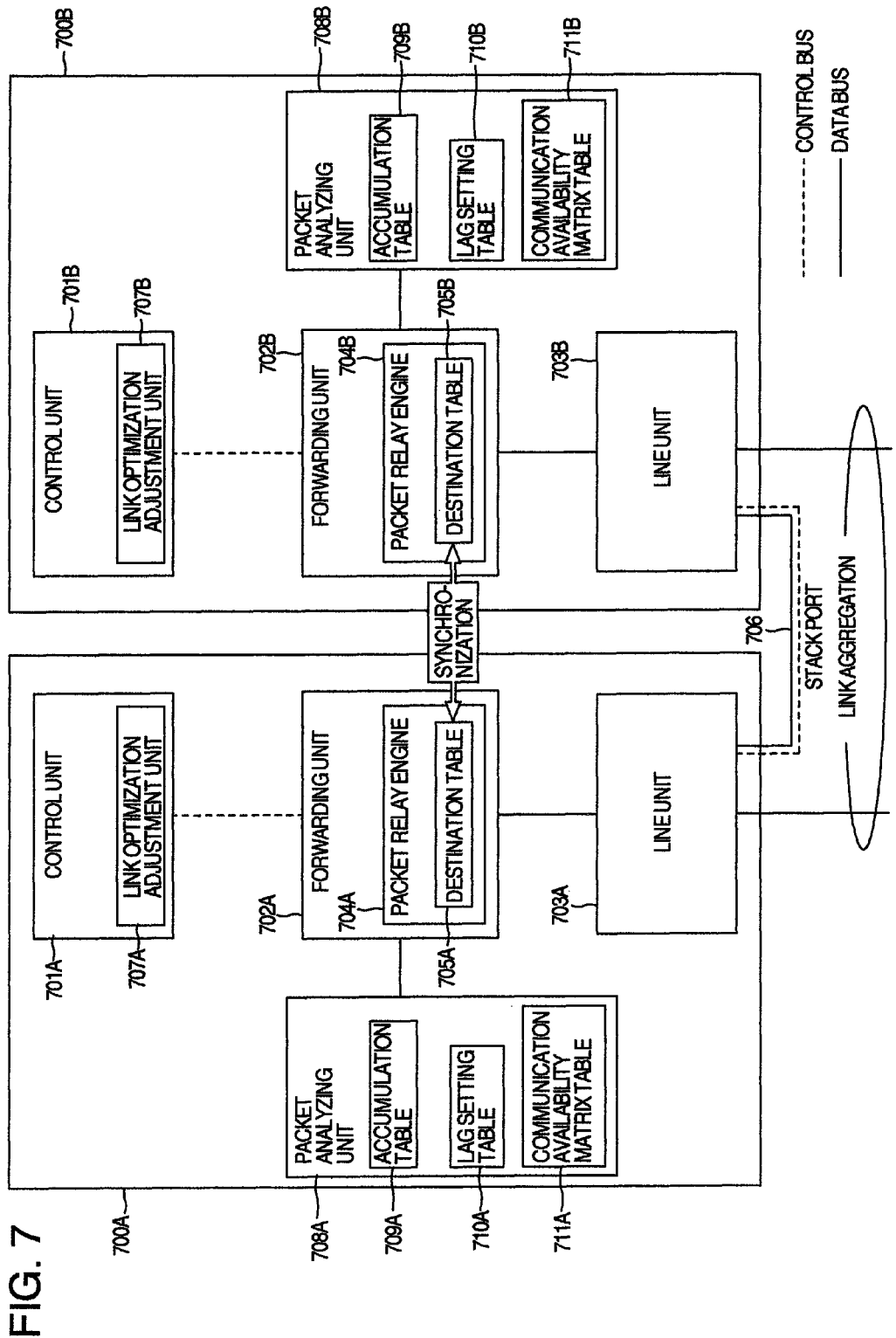
FIG. 7 is a view showing an example of a network relay apparatus.

FIG. 7 shows the construction of the packet relay apparatus of this embodiment. The packet relay apparatus 700 includes a control unit 701, a forwarding unit 702, a line unit 703 and a packet analyzing unit 708. The forwarding unit 702 has therein a packet relay engine 704 and the relay engine 704 has therein a destination table 705. The control unit 701 has therein an optimization adjustment unit 707. The packet analyzing unit 708 has therein an accumulation table 709, an LAG setting table 710 and a communication availability table 711. At least one physical line belonging to the line unit 703 is defined to the stack port 706 and is used as a communication line of the data traffic that must be communicated while bridging a control frame for realizing the inter-unit stack technology and the packet relay apparatuses. Incidentally, the bandwidth of the stack port 706 used for constituting the inter-unit stack can be sped up by a technology logically handling a plurality of lines as one line by the link aggregation.

Next, each block shown in FIG. 7 will be explained in detail. The control unit 701 is a management unit that accepts configuration (setting) of the operator and manages the overall apparatus for setting and exchange information among the forwarding unit 702, the line unit 703 and the packet analyzing unit 708 on the basis of the setting information, and has LAG Group ID information representing to which group of the link aggregation for each apparatus and each line constituting the inter-unit stack shown in FIG. 9 the apparatus belongs.

The control unit 701 has a link optimization adjustment unit 707. The link optimization adjustment unit 707 has means for checking the status of the apparatus construction for the group of the link aggregation constituted by physical lines formed by the inter-unit stack and for determining which line inside the group should be defined as the active port or backup port. The link optimization adjustment unit 707 has the functions of transmitting this result and setting other units. The status judgment method by the link optimization adjustment unit 707 will be described later.

The forwarding unit 702 includes therein a packet relay engine 704 and a destination table 705. When receiving packet information from the line unit 703, the packet relay engine unit 704 inside the forwarding unit 702 extracts destination information contained in the packet information (destination Mac address, destination IP address, etc) and decides the output destination of the packet by collating the extracted destination information with the destination table 705.

The forwarding unit 702 has the functions of copying and outputting the packet information to a plurality of line units 703 when the destination information contained in the packet information is multicast or broadcast. When the output destination is a logical line constituted by the link aggregation, the packet is transferred to the interface belonging to the active port among the physical line units 703 belonging to the corresponding link aggregation group. The forwarding unit 702 further has the function (mirroring) of copying the packet information to a packet analyzing unit 708 when the packet is transferred to the line unit 703.

The line unit 703 plays the roles of receiving the packet from an external communication apparatus and transferring it to the forwarding unit 702 and receiving the packet from the forwarding unit 702 and transferring it to the external communication apparatus. As one of the applications of the line unit 703, the line unit 703 can be used as the stack port 706 for propagating the control information necessary for constituting the inter-unit stack.

The packet analyzing unit 708 has an accumulation table 709 for receiving and analyzing the packet information in the mirror ring form from the forwarding unit 702 and classifying and storing the result of analysis. FIG. 11 shows data information stored in the accumulation table 709. The accumulation table 709 stores a reception apparatus ID of the packet relay apparatus first receiving the packet information and its reception line number, a reception apparatus ID of the packet relay apparatus outputting finally the packet information and its reception line number and traffic information for each combination of information of output priority when the packet transmission is made.

Figure 9:
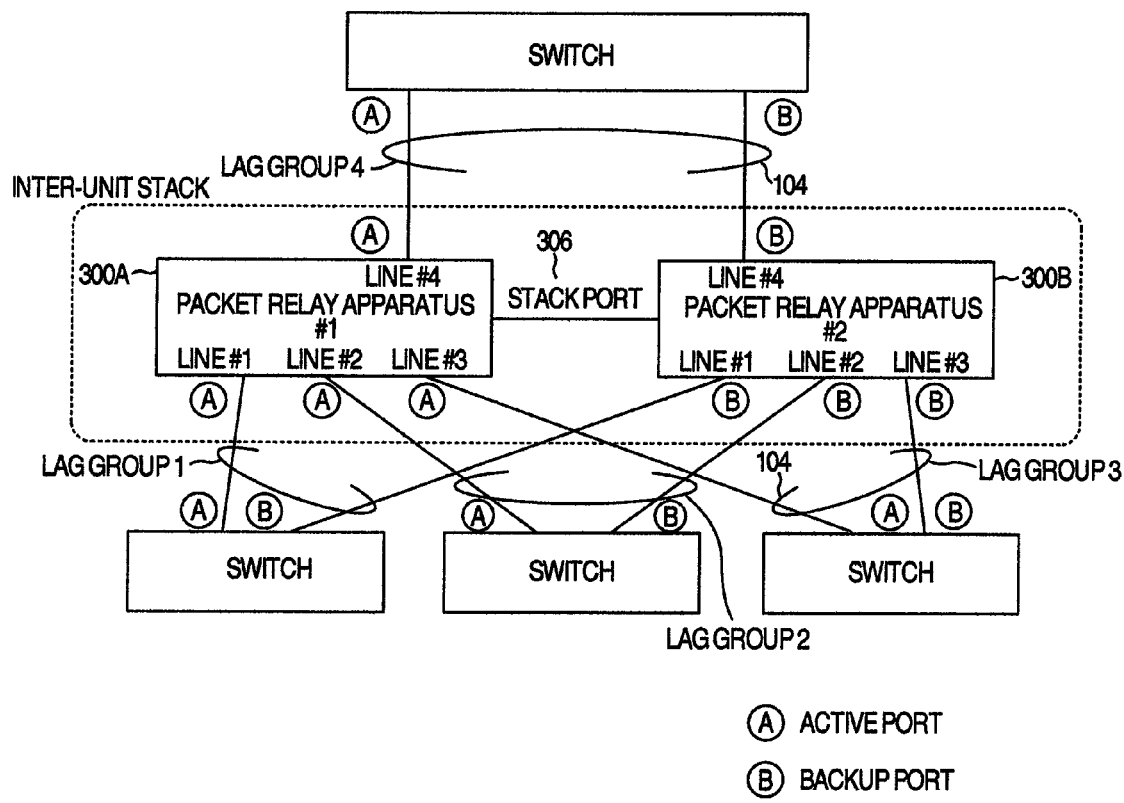
FIG. 9 is view showing a structural example of a stack type network according to the invention.

FIG. 9 shows a structural example of a stack type network. Each line of the packet relay apparatus 300A is set to the active port and each line of the packet relay apparatus 300B is set to the backup port. Since link of each line is normal, the status condition of the link aggregation is in the active port for each line of the apparatus 1 and in the backup port for each line of the apparatus 2.

In the example shown in FIG. 9, the switches downstream of the packet relay apparatuses A and B are all connected through lines to both packet relay apparatuses A and B and the lines to both apparatuses A and B are gathered into the group by link aggregation. In other words, it can be said that the communication route is doubled by the packet relay apparatuses 300A and B.

Setting the packet relay apparatus 300 has will be explained with reference to FIGS. 10A and 10B.

FIG. 10A shows the LAG setting table for setting the link aggregation. The example shown in FIG. 10 represents setting of the link aggregation having the construction shown in FIG. 9. In the packet relay apparatus 300A having the apparatus ID "1", the line numbers (which may be the port numbers, too) "1", "2", "3" and "4" belong to the LAG Groups ID "1", "2", "3" and "4", respectively, and Active//Backup Setting is all set to "Active". Active/Backup Setting is setting that decides whether the port is to be set to Active or Backup.

Active/Backup Status is all set to "Active". The Active/Backup status represents the actual status of the port. It detects and sets periodically the status of the port. The present status is set to "Active" and represents that no problem exists because the status of all the ports set to "Active" is "Active".

FIG. 10B represents a communication permission matrix table for setting permission/inhibition of communication between the ports. The source port and the destination port of the table are expressed by the combination of the apparatus ID and the line number. The symbol "1/1" means the line number "1" of the apparatus ID "1". In the example shown in FIG. 10B, communication between 1 and 2, between 1 and 3 and between 2 and 3 of the link aggregation group is inhibited and the ports capable of communication are limited. Communication can be made only at "1/4", "1/1", "1/2" and "1/3". Because "2/1", "2/2", "2/3" and "2/4" are backup ports, limit of communication in operation is applied to them.

Next, the accumulation table for monitoring the communication traffic will be explained with reference to FIG. 11. The accumulation table is a table including the reception apparatus ID, the reception line number, the transmission apparatus ID, the transmission line number and traffic information.

In the record of the third row in the example shown in FIG. 11, the reception ID is "1", the reception line number is "1", the transmission apparatus ID is "2", the transmission line number is "2" and the traffic information is "341 Mbps". These kinds of information represent that the traffic of 341 Mbps occurs at the port 2 of the packet relay apparatus 300B from the port 1 of the packet relay apparatus 300A and the traffic of this much occurs also at the stack port.

In the examples of the apparatus construction shown in FIGS. 9 and 10, the traffic does not occur at the stack port unless any line fault exists. FIG. 11 shows an example in which the traffic occurs at the stack port, for the purpose of explanation.

Figure 12:
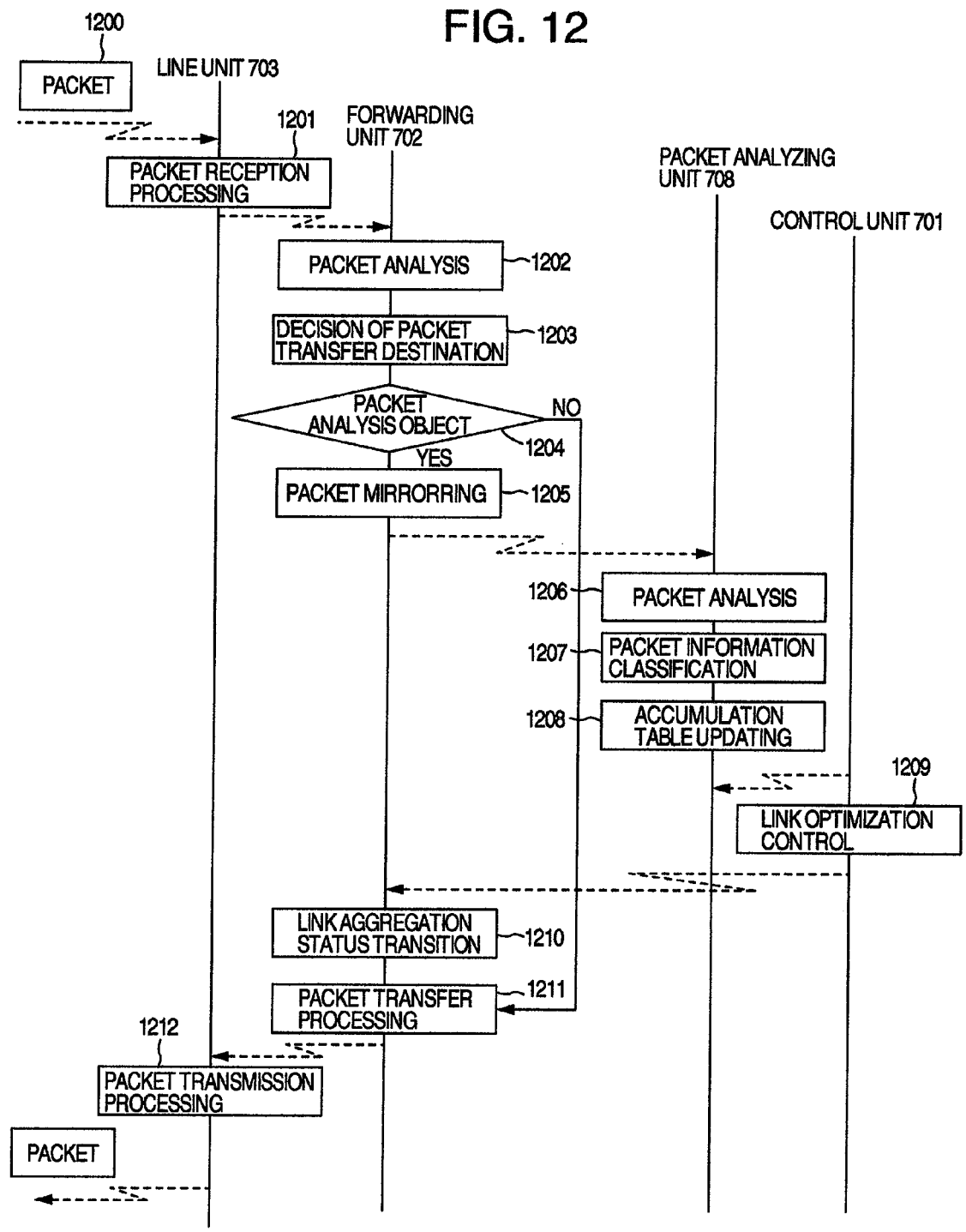
FIG. 12 is a view showing an exemplary flowchart representing a flow of the overall processing from packet reception to packet transmission in a packet relay apparatus.

FIG. 12 shows a flowchart representing the flow of overall processing from packet reception to packet transmission in the packet relay apparatus according to the invention. When the packet 1200 is inputted to the packet relay apparatus according to the invention, the line unit 703 executes a packet reception processing 1201 and checks whether or not the packet is broken. The packet information whose information is not judged as broken but as normal is transferred from the line unit 703 to the forwarding unit 702. Receiving the packet information, the forwarding unit 702 executes a processing of packet analysis 1202 for extracting key information (source MAC address, destination IP address, etc) necessary for controlling packet transfer. The forwarding unit 702 executes a processing of packet transfer destination decision 1203 for judging to which packet port the packet is to be transferred by looking up the key information so extracted and the information stored in the destination table 705. When the transfer destination of the packet is decided, the forwarding unit 702 judges whether it is necessary to analyze in the packet analyzing unit 708. A judgment processing of a packet analysis object 1204 is then made.

The condition as to monitoring in the packet analyzing unit is necessary or not is judged from setting of the control unit 701 and the aforementioned key information. When the packet analysis is judged as unnecessary (no in 1204), the packet transfer processing 1211 for outputting the packet information to the portion decided by the processing of the packet transfer decision 1203 is executed and the packet transmission processing 1211 for transferring the packet information to the outside by the line unit 703 is executed. When the packet analysis is judged as necessary (yes in 1204), processing of the packet mirroring 1205 to the packet analyzing unit 708 is executed by duplicating the packet.

Figure 13:
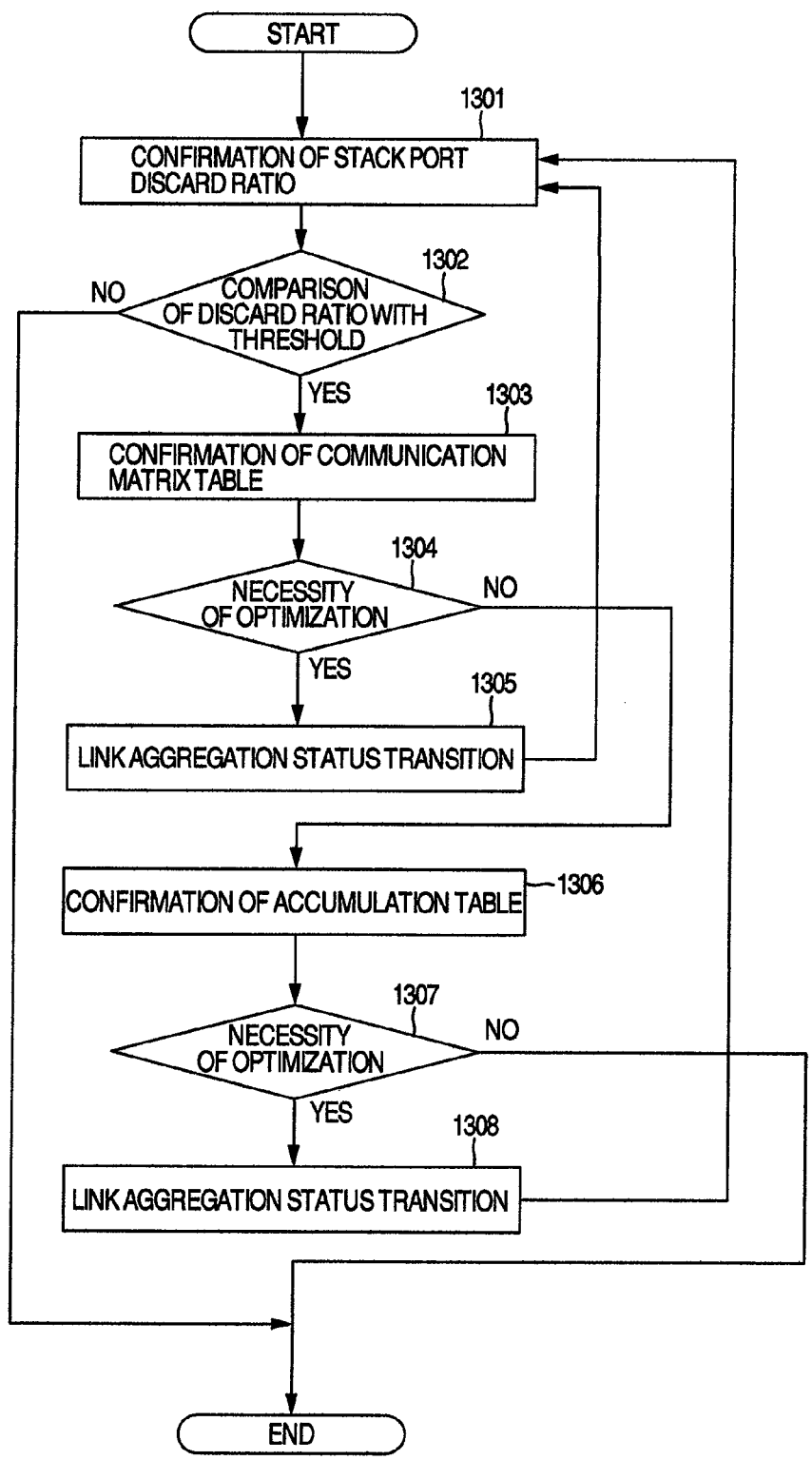
FIG. 13 is a view showing an example of a flowchart representing a flow of judgment processing of link optimization control.

Incidentally, when the processing of the packet mirror ring 1205 is executed, the key information analyzed by the packet analysis 1202 may well be duplicated and transferred, too. The packet analysis 1206 is executed when the packet information duplicated by the packet mirror ring 1205 is received by the packet analyzing unit 708 and the packet information received by the packet information classification 1207 is classified into the reception apparatus ID/reception line number/, transmission apparatus ID/transmission line number/output priority. A processing of an accumulation table updating 1208 for storing the traffic corresponding to the information classified to the accumulation table 709 is executed. The link optimization adjustment unit 707 inside the control unit 701 periodically looks up the accumulation table 709 and executes link optimization control 1209. FIG. 13 shows a flowchart representing the flow of judgment processing of the link optimization control and this processing will be explained later. When the status of the optimum link aggregation is found different from the present status as a result of the link optimization control, the status is changed by link aggregation status transition 1210. A packet transfer processing 1211 for outputting the packet information is then executed and a packet transmission processing 1212 for transferring the packet information to the outside is executed.

FIG. 13 shows a flowchart representing the flow of judgment processing of the link optimization control according to the invention. In the link optimization control according to the invention, the link optimization adjustment unit 707 executes stack port discard ratio confirmation 1301 for looking up discard statistic information of the stack port stored in the forwarding unit 702 so as to investigate the discard ratio in the stack port 706. Furthermore, discard ratio threshold comparison 1302 for comparing the stack port discard ratio confirmed in the proceeding step with a discard ratio set in advance by the operator is executed. When the discard is smaller than the discard ratio threshold value set in advance by the operator as a result of the comparison with the discard ratio threshold and transition of the status of link aggregation is judged as unnecessary (no in 1302), the processing is completed. When the discard is greater than the discard ratio threshold value set in advance by the operator as a result of the comparison with the discard ratio threshold and the status transition of link aggregation needs be checked (yes in 1302), the link optimization adjustment unit 707 executes communication matrix table confirmation 1303 for looking up a communication availability matrix table 1001 stored inside the control unit 701.

Judgment processing for judging whether or not optimization is necessary in the status of the communication matrix confirmed in the preceding step is executed. When the optimization processing of the status transition of the link aggregation is judged as necessary (yes in 1304), the status transition processing 1305 of the link aggregation is executed and then the flow returns to the stack port discard ratio confirmation 1301. Detail of processing 1303 and 1304 will be explained later with reference to FIGS. 14 to 17.

Next, the optimization processing of the status transition of the link aggregation is not judged as necessary (no in 1304), the link optimization adjustment unit 707 executes the accumulation table confirmation 1306 for looking up the accumulation table 709. Furthermore, the judgment processing of the optimization necessity 1307 for judging whether or not optimization is necessary is executed under the status of the accumulation table confirmed in the preceding step. The status transition processing 1308 of the link aggregation is executed when the optimization processing of the status transition of link aggregation is judged as necessary (yes in 1307) and then flow returns to the stack port discard ratio confirmation 1301.

Next, processing 1303 and 1304 will be explained in detail.

Figure 14:
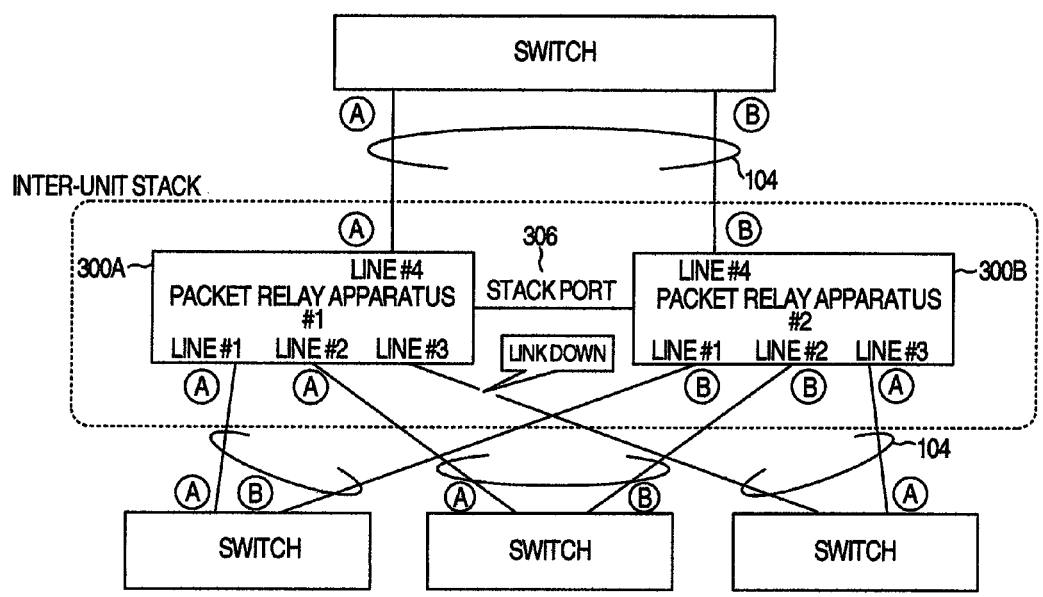
FIG. 14 is a view showing a structural example of a stack type network under the state before execution of optimization processing of link aggregation by information of communication matrix table at the time of line fault is made.

FIG. 14 shows the status of the link aggregation under the condition where the line fault occurs in the line 3 (1/3) of the packet relay apparatus 300A in the apparatus construction of FIG. 9 and where the optimization processing of the link aggregation is not executed. In other words, the drawing shows the state where only the processing in the conventional link aggregation is executed.

In the ordinary processing of the link aggregation, the status line is made solely by the fault inside the group assembling the link aggregation. Therefore, the status transition of the link aggregation occurs only in the LAG Group ID to which the line, in which the line fault occurs, belongs. Referring to FIG. 14, since the line 3 (1/3) of the packet relay apparatus 300A undergoes link-down, the line 3 (2/3) of the packet relay apparatus 300B in the same group as the line 3 (1/3) serves as the active port.

FIG. 15A shows the LAG setting table in FIG. 14. When FIG. 15A is compared with FIG. 10A, it can be seen that the line 3 (1/3) is Link-down in the Active/Backup Status and the line 3 (2/3) is Active instead.

FIG. 15B shows the communication availability table in FIG. 14. In comparison with FIG. 10B, communication is not available in the line 3 (1/3) and the upstream line 4 (1/4) and consequently, communication is available in the line 3 (2/3) and the upstream line 4 (1/4). As for all the portions associated with communication with the line 3 (1/3), the status shifts to the one in which communication is not available.

In consequence, the active ports of the link aggregation groups 1 to 3 become the packet relay apparatus 300A and the active ports of the link aggregation group 4 are the packet relay apparatus 300B, and communication with the upstream switch by the line of the link aggregation group always passes through the stack port. In other words, the traffic occurs at the stack port.

Next, the apparatus construction after the execution of optimization of the link aggregation and various tables will be explained.

Figure 16:
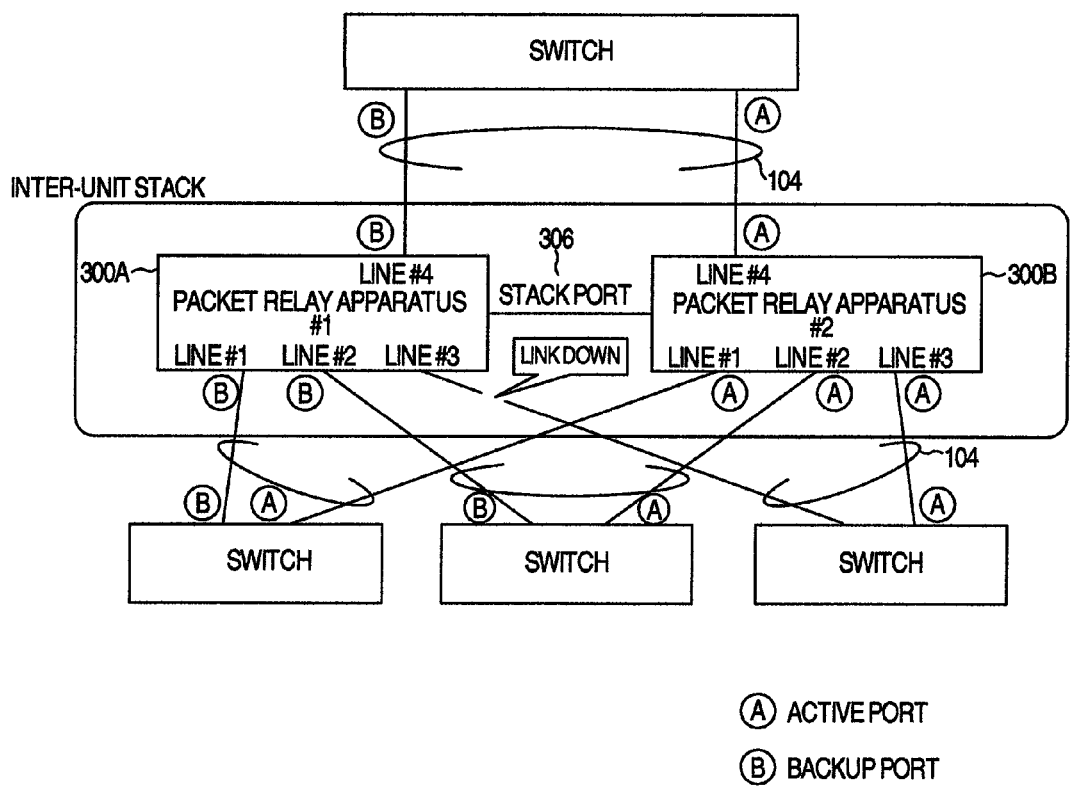
FIG. 16 is a view showing a structural example of a stack type network under the state after execution of optimization processing of link aggregation by information of communication matrix table at the time of line fault is made.

FIG. 16 shows a structural example of the stack type network after the execution of the optimization processing of the link aggregation using the information of the communication matrix table at the time of the line fault by using the technology of the invention. In FIG. 16, not only the line 3 (2/3) of the packet relay apparatus 300B but also all the ports of the packet relay apparatus 300B are set to the active ports. At the same time, all the ports of the packet relay apparatus 300A are set to the backup port.

Accordingly, all the traffics pass only through the packet relay apparatus 300B and no traffic occurs at the stack port.

In the optimization processing of the link aggregation of the processing 1303 and 1304, all the active ports are set to one unit, if it is possible, and in this way, the traffic is prevented from occurring at the stack port.

When the processing 1303 and 1304 are executed in practice, whether or not all the active ports can be set to one unit is judged by referring to FIGS. 15A, 15B or one of the tables. FIGS. 17A and 17B show the table when setting of all the active ports to the packet relay apparatus 300B is practically finished. In comparison with FIG. 15, it can be understood that Active/Backup is switched beside the port that undergoes link-down.

Next, processing 1306 and 1307 will be explained in detail.

The optimization processing by the accumulation table is the processing that judges whether or not the traffic of the stack port can be reduced by setting the ports of either of the apparatuses to Active by referring to the accumulation table when the ports of either of the apparatuses cannot be set wholly to Active as in the processing 1303 and 1304, and sets the ports.

FIG. 18 shows an example of the accumulation table. The accumulation table 1800 in FIG. 18 has a format different from FIG. 11 and has a matrix form. However, either one of the formats or other formats may be used so long as the traffic can be managed among the ports. Incidentally, the example shown in FIG. 18 does not represent the traffic in the setting shown in FIGS. 14 and 16. The traffic is the traffic under the state where the active ports exists in both of the packet relay apparatuses 300A and 300B for the sake of explanation. However, the construction of the system is the same as the one shown in FIGS. 14 and 16.

It can be understood that under the state of the accumulation table shown in FIG. 18, the traffic inputted from the source port (1/1) and outputted to the destination port (2/2) is a large factor that applies load to the stack port. At the destination of the output traffic of the source destination port (2/2), the traffic flows through the ports of both packet relay apparatuses 300A and 300B. Whereas the total band of the traffic to the packet relay apparatus 300A is 4 GB, that is, the sum of the 1 GB to the destination port (1/3) and 3 GB to the destination port (1/4), the total band of the traffic to the packet relay apparatus 300B is 10 GB as the sum of the destination port (2/2). On the contrary, whereas the traffic to the destination port (1/1) is 4 GB, that is, the sum of the 1 GB of the source port (1/3) and 3 GB of the source port (1/4), the total band of the traffic from the packet relay apparatus 300B is 5 GB as the sum from the source port (2/2). Under such a condition, the link optimization adjustment unit 707 can judge that the traffic flowing into the stack port can be reduced much more by shifting the line (2/2) of the backup port forming the link aggregation group with the line 1/1 to the active port.

As described above, the traffic occurring at the stack port can be reduced dynamically by executing either one of the processing 1303, 1304 and the processing 1306, 1307, or both of them. It is thus possible to constitute an efficient system that can reduce much more the number of ports assigned to the stack port and to use a greater number of ports for the data communication between the ordinary apparatuses than the prior art apparatuses.

Embodiment 2

Figure 8:
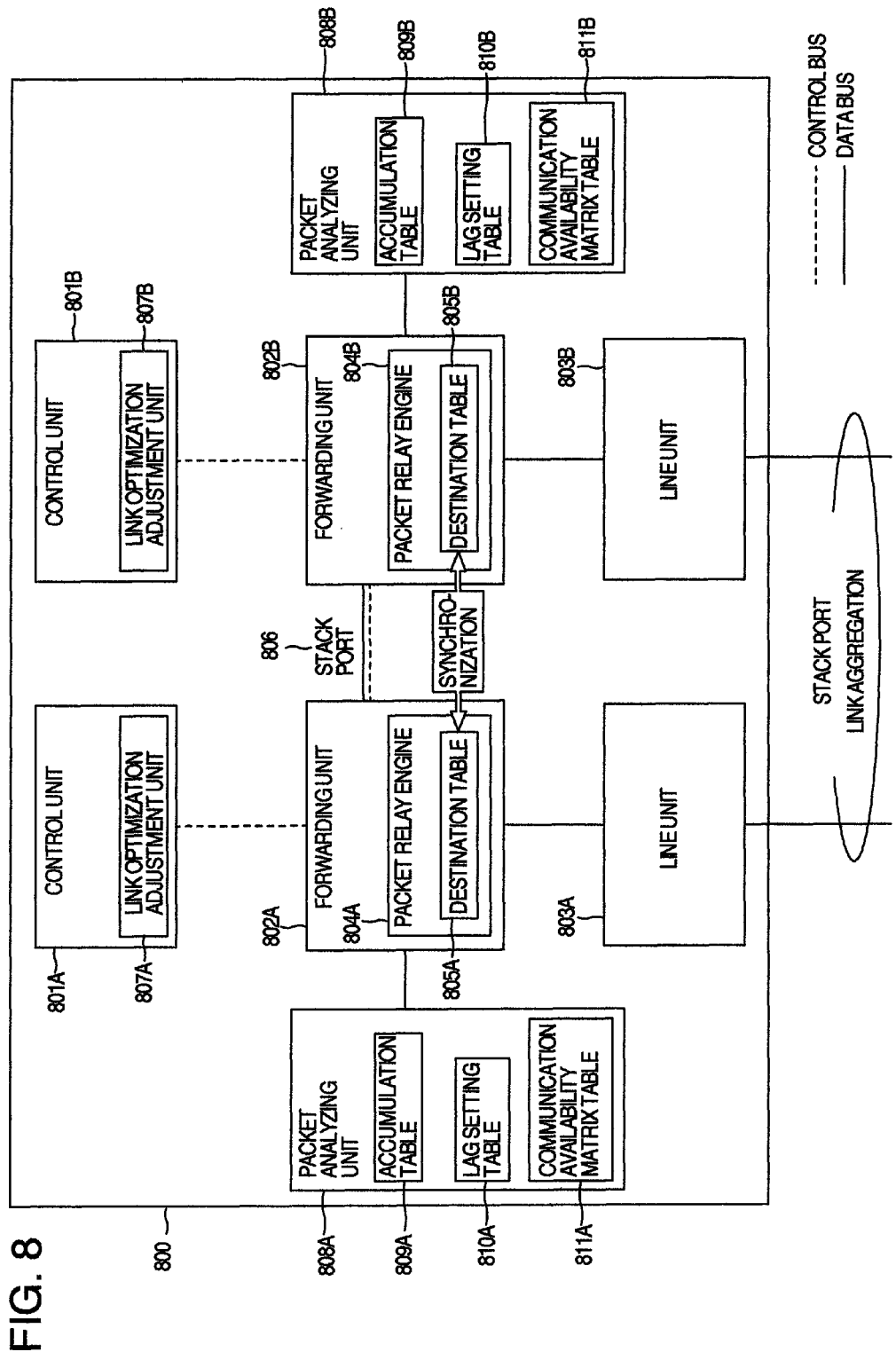
FIG. 8 is a view showing an example of a network relay apparatus.

FIG. 8 shows another embodiment of the packet relay apparatus according to the invention. A packet relay apparatus 800 according to Embodiment 2 of the invention includes a control unit 801, a forwarding unit 802, a line unit 803 and a packet analyzing unit 808. The forwarding unit 802 includes therein a packet relay engine 804 and this packet relay engine 804 includes a destination table 805. The control unit 801 includes therein a link optimization adjustment unit 807.

The packet analyzing unit 808 includes therein an accumulation table 809, an LAG setting table 810 and a communication availability matrix table 811. The forwarding unit 802 is connected by at least one physical line, is defined to a stack port 806 and is used as a communication route of data traffic that must be made while bridging between a control frame necessary for synchronization of the forwarding unit and the forwarding unit 802. Incidentally, the bandwidth of the stack port 706 used for connecting the forwarding unit 802 can be increased by a technology that logically handles a plurality of lines by link aggregation as one line.

The packet relay apparatus 800 shown in FIG. 8 has the same condition except that two sets of apparatuses, that is, the packet relay apparatuses 700A and 700B shown in FIG. 7, are gathered into one unit and the stack port 806 is formed by defining the stack port 706 connecting the packet relay apparatuses as an internal interface inside the packet relay apparatuses. The difference resides only in whether the interface is an external interface or an external interface and is not an essential difference of the technology of the invention. In the embodiment described in FIGS. 7 and 8, the number of the packet relay apparatuses or the packet relay engines is 2 but the invention can be applied to a network system constituted by three or more packet relay apparatuses or packet relay engines.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system including:
a first apparatus having first ports and a first stack port;
a second apparatus having second ports and a second stack port; and
a plurality of logical lines including physical lines which are collectively handled as a link aggregation,
wherein, when the first apparatus and the second apparatus work virtually as one unit,
the first apparatus and the second apparatus are connected at the first stack port and the second stack port,
the plurality of logical lines include at least one of the physical lines as a transfer physical line and at least one of the physical lines as a standby physical line, and
during normal operation, the transfer physical line is connected to the first ports of the first apparatus which are set to active, and the standby physical line is connected to the second ports of the second apparatus which are set to backup, and
when traffic passing through the stack ports between the first and second apparatuses exceeds a predetermined threshold owing to a link down of the transfer physical line, all the second ports of the second apparatus are set to be active ports, and all the first ports of the first apparatus are set to be backup ports to switch the standby physical line to the transfer physical line.

2. The system according to claim 1, further including:
a packet analyzer for monitoring the traffic passing through the stack ports of the first and second apparatuses to determine when the traffic exceeds the predetermined threshold.

3. The system according to claim 1, further including:
a memory storing communication availability for managing communication availability between the first and second ports of the first and second apparatuses to switch between the transfer physical line and the standby physical line.

4. The system according to claim 2, further including:
a memory for storing traffic accumulation between the stack ports of the first and second apparatuses to judge whether or not the traffic between the first and second apparatuses exceeds the predetermined threshold.

5. A system including:
a first apparatus having first ports and a first stack port;
a second apparatus having second ports and a second stack port; and
a plurality of logical lines including physical lines which are collectively handled as a link aggregation,
wherein, when the first apparatus and the second apparatus work virtually as one unit,
the first apparatus and the second apparatus are connected at the first stack port and the second stack port,
the plurality of logical lines include at least one of the physical lines as a transfer physical line and at least one of the physical lines as a standby physical line, and
during normal operation, the transfer physical line is connected to the first ports of the first apparatus which are set to active, and the standby physical line is connected to the second ports of the second apparatus which are set to backup, and when a packet discard ratio of packets passing through the stack ports between the first and second apparatuses exceeds a predetermined threshold owing to a link down of the transfer physical line, all the second ports of the second apparatus are set to be active ports, and all the first ports of the first apparatus are set to be backup ports to switch the standby physical line to the transfer physical line.

6. The system according to claim 5, further including:

a packet analyzer for monitoring the packet discard ratio by a combination of a source port and a destination port, and judging whether or not the packet discard ratio of packets passing through the stack ports between the first and second apparatuses exceeds the predetermined threshold.

7. The system according to claim 5, further including:

a memory storing communication availability for managing communication availability between the first and second ports of each of the first and second apparatuses to switch between the transfer physical line and the standby physical line.

\* \* \* \* \*